J. F. APPLEBY.
COTTON PICKING MACHINE.
APPLICATION FILED AUG. 3, 1908. RENEWED JULY 8, 1912.

1,078,328.

Patented Nov. 11, 1913.

Witnesses:
G. A. Daubenschmidt
D. C. Tanner

Inventor:
John F. Appleby
By G. L. Cragg
Atty

UNITED STATES PATENT OFFICE.

JOHN F. APPLEBY, OF BEAVER COUNTY, OKLAHOMA, ASSIGNOR TO DIXIE COTTON PICKER COMPANY, OF REDFIELD, SOUTH DAKOTA, A CORPORATION OF SOUTH DAKOTA.

COTTON-PICKING MACHINE.

1,078,328. Specification of Letters Patent. Patented Nov. 11, 1913.

Application filed August 3, 1908, Serial No. 446,831. Renewed July 8, 1912. Serial No. 708,318.

*To all whom it may concern:*

Be it known that I, JOHN F. APPLEBY, citizen of the United States, residing in the county of Beaver and State of Oklahoma, have invented a certain new and useful Improvement in Cotton-Picking Machines, of which the following is a full, clear, concise, and exact description, reference being had to the accompanying drawings, forming a part of this specification.

My invention relates to cotton picking machines and particularly to that class of cotton picking machines in which cotton picking fingers are employed that move in horizontal planes, though the invention is not to be restricted to the employment of picking fingers that move in horizontal planes.

The machine employing the preferred embodiment of my invention, includes duplicated picking mechanisms, each adapted to remove cotton from the plants of a row, and although I prefer a machine that is adapted to pick cotton from two rows of plants at a time, I do not wish to be limited to a machine that is capable of picking cotton from two rows of plants at a time.

It is well known by those skilled in the art that cotton picking machines have hitherto been devised employing two picking mechanisms including fingers adapted to move in horizontal planes, but the picking fingers of both picking mechanisms operated upon the cotton plants of a single row. In the device of my invention, the picking fingers of a single picking mechanism pick the cotton from the plants of one row and the picking fingers of the companion picking mechanism pick the cotton from the plants of an adjacent row, so that the machine of my invention containing no more mechanism than machines of the prior art, is adapted to perform twice the work performed by machines of the prior art. A cotton picking machine constructed in accordance with my invention, having one-half of the picking mechanism of machines of the prior art of the class specified, is capable of doing as much work as such cotton picking machines of the prior art. I consider it to be broadly new with me, therefore, so to construct a machine having picking fingers moving in horizontal planes, that one picking mechanism may pick cotton from a row of plants without the coöperation of another picking mechanism working upon the same row of plants.

Broadly speaking, therefore, my invention resides in retaining one of the picking mechanisms working upon the cotton plants in a single row and associating therewith mechanism that will coöperate with the single picking mechanism retained, to enable said mechanism to remove cotton from the plants of a single row. This mechanism associated with the retained picking mechanism constitutes, in the preferred embodiment of the invention, a swinging resisting element that serves to compress the cotton plants within a channel constituted of the swinging resisting element and a slotted wall through which the cotton picking fingers project across said channel and into the bushes that are moving through said channel. The swinging resisting element is desirably longitudinally slotted, the slots thereof being coincident with the horizontal planes of movement of the picking fingers, which thus may project into the slots of the resisting element. The resisting element is desirably spring-pressed, so as to suitably compress the cotton plants, to enable the picking fingers to remove cotton therefrom, the spring mechanism that compresses the resisting element being sufficiently powerful to accomplish this result, the spring mechanism being so proportioned, however, that a balance is effected between the force it exerts upon the cotton plants and the resistance offered by the cotton plants, so that the cotton plants are suitably compressed for the purpose stated.

The machine of the preferred embodiment of my invention, as has hitherto been suggested, comprises duplicated mechanisms, each possessing a channel for receiving the plants of a cotton row, each possessing a group of picking fingers that move in horizontal planes, and each possessing a resisting element, preferably swingingly mounted and spring-pressed, whereby the machine is adapted to pick cotton from two rows of plants at the same time.

I will explain my invention more fully by reference to the accompanying drawings, showing the preferred embodiment thereof, in which—

Like parts are indicated by similar characters of reference throughout the different figures.

The cotton picking machine of the preferred embodiment of my invention has two traction wheels $a\ a$ mounted upon a U-shaped shaft $b$. A shaft $b^1$ is driven by a traction wheel through the intermediation of suitable gearing $b^2$ and has a bevel pinion $b^3$ in gear with a bevel gear wheel $b^5$ fixed upon the shaft $b^4$. The miter-gear $b^5$ drives the miter-pinion $b^6$ fixed upon a shaft $b^7$ that, in turn, carries a miter-pinion $b^8$ in driving relation with a miter-gear $b^9$ that is fixed upon a vertical shaft $b^{10}$. The vertical shafts $b^4$ and $b^{10}$ constitute the main driving shafts for the duplicated picking mechanisms, each of which includes cotton picking fingers $c$, stripping wheels $d$ for removing the cotton from the picking fingers, and cleaning wheels $e$ that discharge the cotton that has been stripped into an elevator channel $f$. I do not deem it necessary to describe in detail each of the cotton picking mechanisms, for such mechanisms are well known to those skilled in the art. It should suffice to say that I employ picking mechanisms having cotton picking fingers $c$ located in a plurality of horizontal planes and which are adapted to be projected through the slots $g$ of a wall $h$, which wall constitutes a side of a channel through which the cotton plants pass. These cotton picking fingers are projected through these slots $g$ into said plant channel and are withdrawn therefrom in a manner which is well known to those skilled in the art. It has not been known to those skilled in the art, however, that but one set of cotton picking fingers may be projected horizontally into the cotton plant-receiving channel, for it is the well established practice of the art to provide duplicated cotton plant picking mechanisms, the picking fingers of one being projected into a cotton plant-receiving channel from one side of the channel and the picking fingers of the other being projected into the cotton plant-receiving channel from the other side of the channel, each set of picking fingers doing but part of the picking. Instead of providing similar cotton picking mechanisms between which the cotton plant-receiving channel is disposed, I have but one cotton picking mechanism in association with each channel and located upon one side thereof, the mechanism upon the other side of the cotton plant-receiving channel being of a most simple character and comprising a resisting element illustrated at $i$. This resisting element is desirably swingingly mounted by being pivoted at its forward portion at $k$ and is spring-pressed by the spring mechanism $l$, so that there is always a forceful tension upon the swinging element that moves and compresses the cotton plants toward the opposed wall $h$, this spring mechanism exerting a force which, in co-action with the resistance offered by the cotton plants, will serve to maintain the cotton plants under a suitable degree of compression to enable the picking fingers properly to perform their function. The swinging resisting element $i$ desirably has an imperforate outer wall $m$ that supports a series of planks or ridges $n$, which afford between them slots into which the free ends of the associate picking fingers are received. The spring mechanism is desirably so adjusted that the free ends of the picking fingers will always enter said recesses, so that the passage of the picking fingers through the cotton plants is assured. The resisting element $i$ constitutes, as has been suggested, a plant-receiving channel wall that is companion to the channel wall $h$, the channel wall $i$, by being swingingly mounted at its forward end, readily adapting itself to the plants that enter the channel and being so constructed as not to thrust the plants away from the channel, but, on the other hand, being so constructed as to guide the plants into the channel by being chamfered as indicated at $o$.

Figure 1:
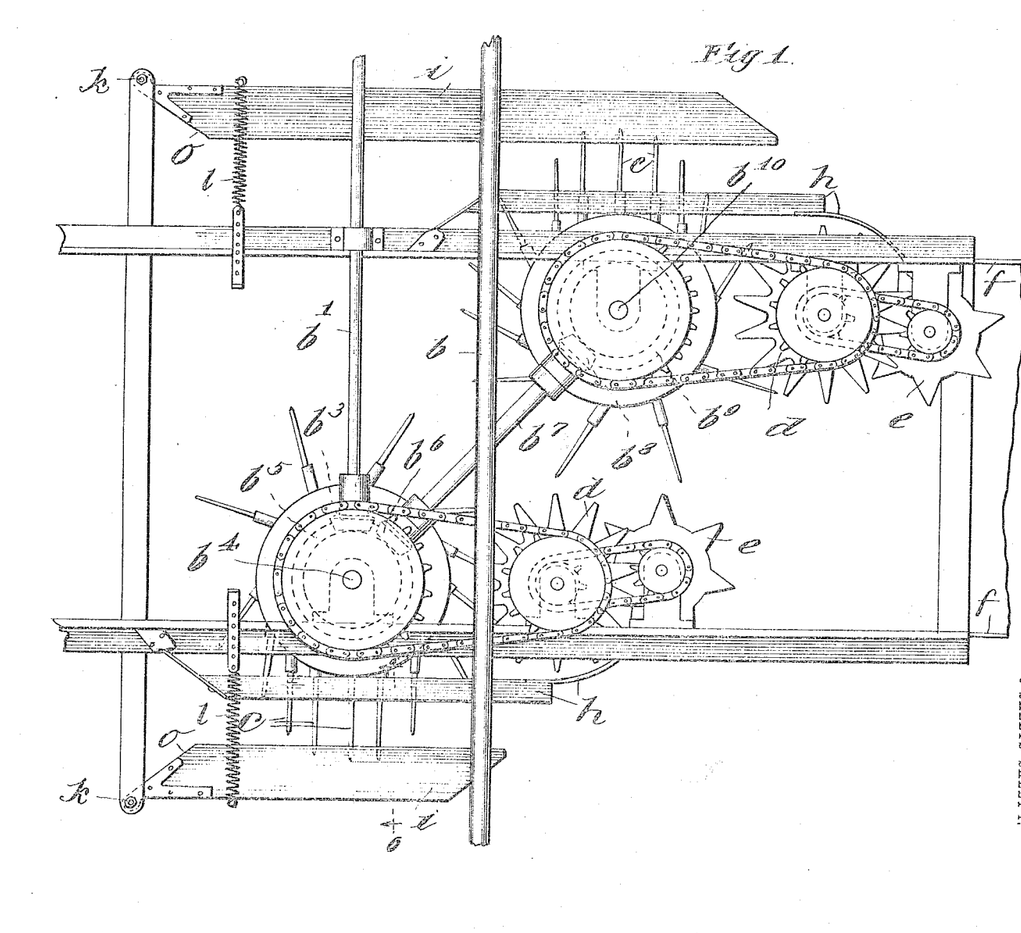
Figure 1 is a plan view of a part of the machine, portions being removed to reveal certain parts.
Figure 2:
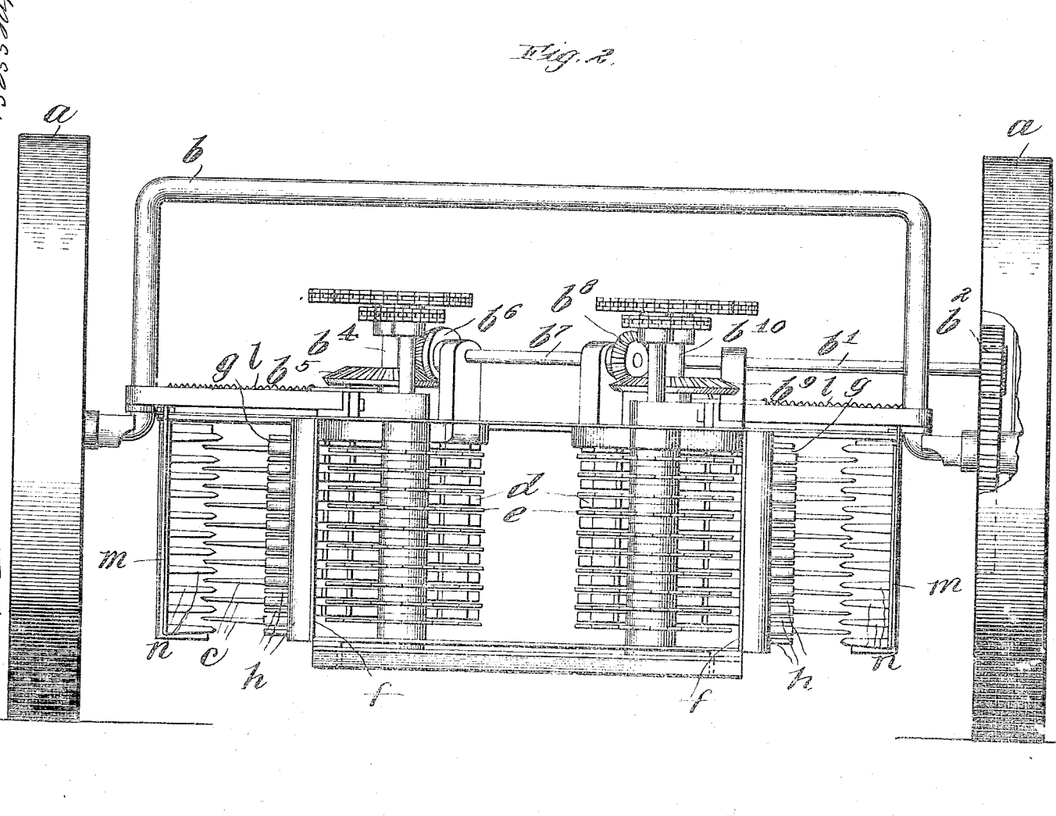
Fig. 2 is a rear elevation.
Figure 3:
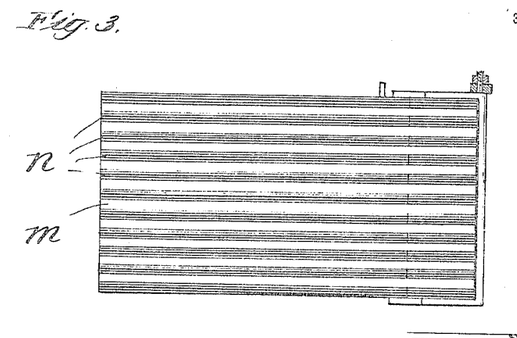
Fig. 3 is an elevation of a cotton plant receiving channel.
Figures 4, 5:
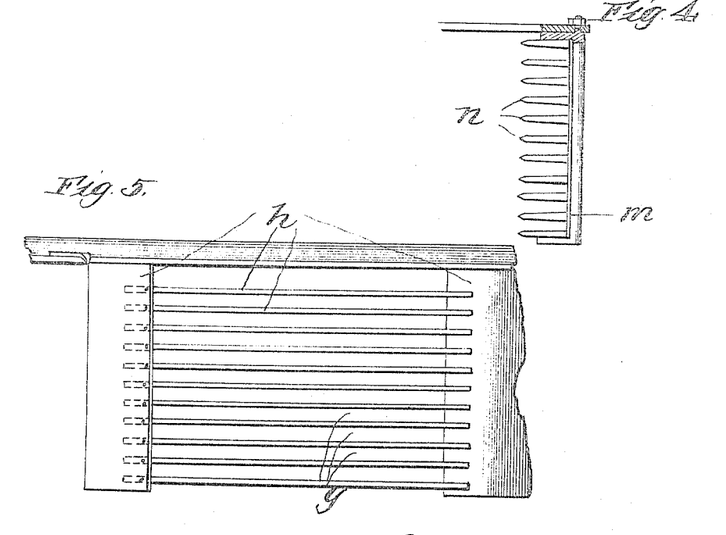
Fig. 4 is an end view of the element shown in Fig. 3.
Fig. 5 is an elevation of the opposite channel wall through which the cotton picking fingers pass.
Figure 6:
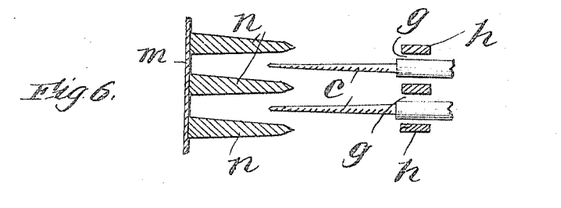
Fig. 6 is a sectional view on line 6 6 of Fig. 1.

Inasmuch as the two picking mechanisms which I have illustrated are duplicates of each other, I will not describe both mechanisms, as the description which I have given will suffice as a description of both mechanisms, similar characters of reference being applied to similar parts of each of these mechanisms.

When two mechanisms are assembled in a single machine, the resisting elements $i$ are desirably adjacent to the traction wheels $a$, the two picking mechanisms being so arranged that they together pass between adjacent rows of plants, said adjacent rows of plants being between the traction wheels, as will be apparent by an inspection of the drawing. Where a double machine is employed, the frame work thereof is desirably so constructed that it will support two shafts to accommodate three horses, one horse traveling between the two rows being picked and the other two horses upon the outside of said rows.

As I have embodied my invention, I have employed two traction wheels whose arrangement is such that the resisting elements $i$ lie directly between said traction wheels and the opposed slotted walls $h$, but it is to be understood that I do not limit myself to the number of traction wheels employed, but regard the arrangement indicated as the best type of construction.

It should be noted that in order to carry out my invention the cotton picking fingers of each mechanism project substantially entirely across the cotton plant-receiving channels, in order that they may fully perform their function, this being a prominent distinction between the apparatus of my invention and the apparatus of the prior art, where the cotton picking fingers of each set project but partially across the cotton plant-receiving channels, thereby necessitating the employment of two sets of cotton picking fingers per channel.

While I have herein shown and particularly described the preferred embodiment of my invention, I do not wish to be limited thereto, as charges may readily be made without departing from the spirit thereof, but,

Having thus described my invention, I claim as new and desire to secure by Letters Patent the following:—

1. A cotton picking machine having a cotton plant-receiving channel whose walls flank a row of cotton plants that the channel is adapted to receive, and cotton picking mechanism including fingers that are projected substantially from one side of said channel to the other, the wall of the channel opposite the bases of the fingers being recessed to receive the free ends of said fingers.

2. A cotton picking machine having a cotton plant-receiving channel whose walls flank a row of cotton plant portions that the channel is adapted to receive, cotton picking mechanism including fingers that are projected substantially from one side of said channel to the other, and means whereby one of the channel walls may be moved toward and from the other channel wall during the operation of the machine to press the cotton plant portions between the channel walls.

3. A cotton picking machine having a cotton plant-receiving channel whose walls flank a row of cotton plant portions that the channel is adapted to receive, cotton picking mechanism including fingers that are projected substantially from one side of said channel to the other, the wall of the channel opposite the bases of the fingers being recessed to receive the free ends of said fingers, and means whereby the space intervening between the channel walls may be adjusted.

4. A cotton picking machine having a cotton plant-receiving channel whose walls flank a row of cotton plant portions that the channel is adapted to receive, cotton picking mechanism including fingers that are projected substantially from one side of said channel to the other, and means whereby the space intervening between the channel walls may be automatically adjusted.

5. A cotton picking machine having a cotton plant-receiving channel whose walls flank a row of cotton plant portions that the channel is adapted to receive, cotton picking mechanism including fingers that are projected substantially from one side of said channel to the other, the wall of the channel opposite the bases of the fingers being recessed to receive the free ends of said fingers, and means whereby the space intervening between the channel walls may be automatically adjusted.

6. A cotton picking machine having a cotton plant-receiving channel whose walls flank a row of cotton plant portions that the channel is adapted to receive, and cotton picking mechanism including fingers that are projected substantially from one side of said channel to the other, the channel wall farthest from the picking mechanism being swingingly mounted.

7. A cotton picking machine having a cotton plant-receiving channel whose walls flank a row of cotton plant portions that the channel is adapted to receive, and cotton picking mechanism including fingers that are projected substantially from one side of said channel to the other, the wall of the channel opposite the bases of the fingers being recessed to receive the free ends of said fingers, the channel wall farthest from the picking mechanism being swingingly mounted.

8. A cotton picking machine having a cotton plant receiving channel whose walls flank a row of cotton plant portions that the channel is adapted to receive, and cotton picking mechanism including fingers that are projected substantially from one side of said channel to the other, the channel wall farthest from the picking mechanism being swingingly mounted at its forward end.

9. A cotton picking machine having a cotton plant-receiving channel whose walls flank a row of cotton plant portions that the channel is adapted to receive, and cotton picking mechanism including fingers that are projected substantially from one side of said channel to the other, the wall of the channel opposite the bases of the fingers being recessed to receive the free ends of said fingers, the channel wall farthest from the picking mechanism being swingingly mounted at its forward end.

10. A cotton picking machine having a cotton plant-receiving channel whose walls flank a row of cotton plant portions that the channel is adapted to receive, cotton picking mechanism including fingers that are projected substantially from one side of said channel to the other, the channel wall farthest from the picking mechanism being swingingly mounted, and spring mechanism for pressing the channel wall toward the picking mechanism.

11. A cotton picking machine having a cotton plant-receiving channel whose walls flank a row of cotton plant portions that the channel is adapted to receive, cotton picking mechanism including fingers that are projected substantially from one side of said channel to the other, the wall of the channel opposite the bases of the fingers being recessed to receive the free ends of said fingers, the channel wall farthest from the picking mechanism being swingingly mounted, and spring mechanism for pressing the channel wall toward the picking mechanism.

12. A cotton picking machine having a cotton plant-receiving channel whose walls flank a row of cotton plant portions that the channel is adapted to receive, cotton picking mechanism including fingers that are projected substantially from one side of said channel to the other, the channel wall farthest from the picking mechanism being swingingly mounted at its forward end, and spring mechanism for pressing the channel wall toward the picking mechanism.

13. A cotton picking machine having a cotton plant-receiving channel whose walls flank a row of cotton plant portions that the channel is adapted to receive, cotton picking mechanism including fingers that are projected substantially from one side of said channel to the other, the wall of the channel opposite the bases of the fingers being recessed to receive the free ends of said fingers, the channel wall farthest from the picking mechanism being swingingly mounted at its forward end, and spring mechanism for pressing the channel wall toward the picking mechanism.

14. A cotton picking machine including two picking mechanisms mounted upon the same vehicle and adapted together to pass between adjacent rows of cotton plants, and including picking fingers projected by the picking mechanism toward the sides of the machine, the fingers of one picking mechanism projecting toward one side of the machine and the fingers of the other mechanism projecting toward the other side of the machine, and an upright channel wall along each side of and away from the body of the machine, toward which channel walls the picking fingers extend angularly to the vertical and to the line of travel of the machine to pick cotton from the plants entering between said walls and the body of the machine.

15. A cotton picking machine including picking fingers and picking finger operating apparatus, said picking fingers and apparatus being adapted for passage between adjacent rows of cotton plants, the picking finger operating apparatus being adapted to project picking fingers toward both sides of the machine into the plants between which said apparatus is passing, and an upright channel wall along each side of and away from the body of the machine, toward which channel walls the picking fingers extend angularly to the vertical and to the line of travel of the machine to pick cotton from the plants entering between said walls and the body of the machine, whereby cotton may be picked from the adjacent rows of cotton plants at the same time.

16. A cotton picking machine having a cotton plant-receiving channel whose walls flank a row of cotton plants that the channel is adapted to receive, and cotton picking mechanism operated by the machine in traveling and including fingers that are projected substantially from one side of said channel to the other, the wall of the channel opposite the bases of the fingers being recessed to receive the free ends of said fingers 17. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, and means whereby one of the channel walls may be moved toward and from the other channel wall during the operation of the machine to press the cotton plants between the channel walls.

18. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the wall of the channel opposite the bases of the fingers being recessed to receive the free ends of said fingers, and means whereby the space intervening between the channel walls may be adjusted.

19. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, and means whereby the space intervening between the channel walls may be automatically adjusted.

20. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the wall of the channel opposite the bases of the fingers being recessed to receive the free ends of said fingers, and means whereby the space intervening between the channel walls may be automatically adjusted.

21. A cotton picking machine having a cotton plant-receiving channel whose walls flank a row of cotton plant portions that the channel is adapted to receive, and cotton picking mechanism operated by the machine in traveling and including fingers that are projected substantially from one side of said channel to the other, the channel wall farthest from the picking mechanism being swingingly mounted.

22. A cotton picking machine having a cotton plant-receiving channel whose walls flank a row of cotton plant portions that the channel is adapted to receive, and cotton picking mechanism operated by the machine in traveling and including fingers that are projected substantially from one side of said channel to the other, the wall of the channel opposite the bases of the fingers being recessed to receive the free ends of said fingers, the channel wall farthest from the picking mechanism being swingingly mounted.

23. A cotton picking machine having a cotton plant-receiving channel whose walls flank a row of cotton plant portions that the channel is adapted to receive, and cotton picking mechanism operated by the machine in traveling and including fingers that are projected substantially from one side of said channel to the other, the channel wall farthest from the picking mechanism being swingingly mounted at its forward end.

24. A cotton picking machine having a cotton plant-receiving channel whose walls flank a row of cotton plant portions that the channel is adapted to receive, and cotton picking mechanism operated by the machine in traveling and including fingers that are projected substantially from one side of said channel to the other, the wall of the channel opposite the bases of the fingers being recessed to receive the free ends of said fingers, the channel wall farthest from the picking mechanism being swingingly mounted at its forward end.

25. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the channel wall farthest from the picking mechanism being swingingly mounted, and spring mechanism for pressing the channel wall toward the picking mechanism.

26. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the wall of the channel opposite the bases of the fingers being recessed to receive the free ends of said fingers, the channel wall farthest from the picking mechanism being swingingly mounted, and spring mechanism for pressing the channel wall toward the picking mechanism.

27. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the channel wall farthest from the picking mechanism being swingingly mounted at its forward end, and spring mechanism for pressing the channel wall toward the picking mechanism.

28. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, the wall of the channel opposite the bases of the fingers being recessed to receive the free ends of said fingers, the channel wall farthest from the picking mechanism being swingingly mounted at its forward end, and spring mechanism for pressing the channel wall toward the picking mechanism.

29. A cotton picking machine including two picking mechanisms operated by the machine in traveling and mounted upon the same vehicle and adapted together to pass between adjacent rows of cotton plants, and including picking fingers projected by the picking mechanisms toward the sides of the machine, the fingers of one picking mechanism projecting toward one side of the machine and the fingers of the other mechanism projecting toward the other side of the machine, and an upright channel wall along each side of and away from the body of the machine, toward which channel walls the picking fingers extend angularly to the vertical and to the line of travel of the machine to pick cotton from the plants entering between said walls and the body of the machine.

30. A cotton picking machine including picking fingers and picking finger operating apparatus actuated by the machine in traveling, said picking fingers and apparatus being adapted for passage between adjacent rows of cotton plants, the picking finger operating apparatus being adapted to project picking fingers toward both sides of the machine into the plants between which said apparatus is passing, and an upright channel wall along each side of and away from the body of the machine, toward which channel walls the picking fingers extend angularly to the vertical and to the line of travel of the machine to pick cotton from the plants entering between said walls and the body of the machine, whereby cotton may be picked from the adjacent rows of cotton plants at the same time.

31. A cotton picking machine having a cotton plant-receiving channel whose walls flank a row of cotton plant portions that the channel is adapted to receive, cotton picking mechanism operated by the machine in traveling, and means whereby the space intervening between the channel walls may be automatically adjusted.

32. A cotton picking machine having a cotton plant-receiving channel whose walls flank a row of cotton plant portions that the channel is adapted to receive, cotton picking mechanism operated by the machine in traveling, and spring mechanism acting upon a channel wall to adjust the space between the channel walls.

33. A cotton picking machine having a cotton plant-receiving channel whose walls flank a row of cotton plant portions that the channel is adapted to receive, cotton picking mechanism operated by the machine in traveling, and spring mechanism for pressing the channel wall opposite the picking mechanism toward the picking mechanism.

34. A cotton picking machine having a cotton plant-receiving channel whose walls flank a row of cotton plant portions that the channel is adapted to receive, cotton picking mechanism operated by the machine in traveling, and automatically operating mechanism for pressing the channel wall opposite the picking mechanism toward the picking mechanism.

35. A cotton picking machine having a cotton plant receiving channel whose walls flank a row of cotton plant portions that the channel is adapted to receive, cotton picking mechanism operated by the machine in traveling and including cotton picking fingers that are projected substantially across the channel, and automatically operating mechanism for pressing the channel wall opposite the picking mechanism toward the picking mechanism.

36. A cotton picking machine having a cotton plant receiving channel whose walls flank a row of cotton plant portions that the channel is adapted to receive, cotton picking mechanism operated by the machine in traveling and including cotton picking fingers that are projected substantially across the channel, and spring mechanism for pressing the channel wall opposite the picking mechanism toward the picking mechanism.

37. A cotton picking machine having a cotton plant-receiving channel whose walls flank a row of cotton plant portions that the channel is adapted to receive, cotton picking mechanism, and automatically operating mechanism for pressing the channel wall opposite the picking mechanism toward the picking mechanism.

38. A cotton picking machine having a cotton plant-receiving channel whose walls flank a row of cotton plant portions that the channel is adapted to receive, cotton picking mechanism including cotton picking fingers that are projected substantially across the channel, and automatically operating mechanism for pressing the channel wall opposite the picking mechanism toward the picking mechanism.

39. A cotton picking machine having a cotton plant-receiving channel whose walls flank a row of cotton plant portions that the channel is adapted to receive, cotton picking mechanism including cotton picking fingers that are projected substantially across the channel, and spring mechanism for pressing the channel wall opposite the picking mechanism toward the picking mechanism.

40. A cotton picking machine having a cotton plant-receiving channel whose walls flank a row of cotton plant portions that the channel is adapted to receive, cotton picking mechanism, and spring mechanism for pressing the channel wall opposite the picking mechanism toward the picking mechanism.

41. A cotton picking machine having a cotton plant-receiving channel whose walls flank a row of cotton plant portions that the channel is adapted to receive, cotton picking mechanism including fingers that are projected substantially from one side of said channel to the other, and means whereby the channel wall farthest from the picking mechanism may be moved toward and from the other channel wall during the operation of the machine to press the cotton plant portions between the channel walls.

42. A cotton picking machine having a cotton plant-receiving channel whose walls flank a row of cotton plant portions that the channel is adapted to receive, cotton picking mechanism including fingers that are projected substantially from one side of said channel to the other, and automatic means whereby the channel wall farthest from the picking mechanism may be moved toward and from the other channel wall during the operation of the machine to press the cotton plant portions between the channel walls.

43. A cotton picking machine having a cotton plant-receiving channel whose walls flank a row of cotton plant portions that the channel is adapted to receive, cotton picking mechanism including fingers that are projected substantially from one side of said channel to the other, and spring actuated means whereby the channel wall farthest from the picking mechanism may be moved toward and from the other channel wall during the operation of the machine to press the cotton plant portions between the channel walls.

44. A cotton picking machine having a cotton plant-receiving channel whose walls flank a row of cotton plant portions that the channel is adapted to receive, cotton picking mechanism, and automatic means whereby the channel wall farthest from the picking mechanism may be moved toward and from the other channel wall during the operation of the machine to press the cotton plant portions between the channel walls.

45. A cotton picking machine having a cotton plant-receiving channel whose walls flank a row of cotton plant portions that the channel is adapted to receive, cotton picking mechanism, and spring actuated means whereby the channel wall farthest from the picking mechanism may be moved toward and from the other channel wall during the operation of the machine to press the cotton plant portions between the channel walls.

46. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, and means whereby the channel wall farthest from the picking mechanism may be moved toward and from the other channel wall during the operation of the machine to press the cotton plant portions between the channel walls.

47. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, and automatic means whereby the channel wall farthest from the picking mechanism may be moved toward and from the other channel wall during the operation of the machine to press the cotton plant portions between the channel walls.

48. A cotton picking machine having a cotton plant-receiving channel whose walls flank a row of cotton plant portions that the channel is adapted to receive, cotton picking mechanism operated by the machine in traveling and including fingers that are projected substantially from one side of said channel to the other, and spring actuated means whereby the channel wall farthest from the picking mechanism may be moved toward and from the other channel wall during the operation of the machine to press the cotton plant portions between the channel walls.

49. A cotton picking machine having a cotton plant-receiving channel whose walls flank a row of cotton plant portions that the channel is adapted to receive, cotton picking mechanism operated by the machine in traveling, and automatic means whereby the channel wall farthest from the picking mechanism may be moved toward and from the other channel wall during the operation of the machine to press the cotton plant portions between the channel walls.

50. A cotton picking-machine having a cotton plant-receiving channel whose walls flank a row of cotton plant portions that the channel is adapted to receive, cotton picking mechanism operated by the machine in traveling, and spring actuated means whereby the channel wall farthest from the picking mechanism may be moved toward and from the other channel wall during the operation of the machine to press the cotton plant portions between the channel walls.

51. A cotton picking machine having a cotton plant-receiving channel whose walls flank a row of cotton plants that the channel is adapted to receive, and cotton picking mechanism including fingers that are projected entirely from one side of said channel to the other.

52. A cotton picking machine having a cotton plant-receiving channel whose walls flank a row of cotton plants that the channel is adapted to receive, and cotton picking mechanism operated by the machine in traveling and including fingers that are projected entirely from one side of said channel to the other.

53. A cotton picking machine including two picking mechanisms mounted upon the same vehicle and adapted together to pass between adjacent rows of cotton plants, and including picking fingers which are axially rotated and are inserted within and withdrawn from the cotton plants and are projected by the picking mechanisms toward the sides of the machine, the fingers of one picking mechanism projecting toward one side of the machine and the fingers of the other mechanism projecting toward the other side of the machine, and an upright channel wall along each side of and away from the body of the machine, toward which channel walls the picking fingers extend angularly to the vertical and to the line of travel of the machine to pick cotton from the plants entering between said walls and the body of the machine.

54. A cotton picking machine including picking fingers which are axially rotated and are inserted within and withdrawn from the cotton plants, picking finger operating apparatus, said picking fingers and apparatus being adapted for passage between adjacent rows of cotton plants, the picking finger operating apparatus being adapted to project picking fingers toward both sides of the machine into the plants between which said apparatus is passing, whereby cotton may be picked from the adjacent rows of cotton plants at the same time, and an upright channel wall along each side of and away from the body of the machine, toward which channel walls the picking fingers extend angularly to the vertical and to the line of travel of the machine to pick cotton from the plants entering between said walls and the body of the machine.

55. A cotton picking machine including two picking mechanisms operated by the machine in traveling and mounted upon the same vehicle and adapted together to pass between adjacent rows of cotton plants, and including picking fingers which are axially rotated and are inserted within and withdrawn from the cotton plants and are projected by the picking mechanisms toward the sides of the machine, the fingers of one picking mechanism projecting toward one side of the machine and the fingers of the other mechanism projecting toward the other side of the machine, and an upright channel wall along each side of and away from the machine and the fingers of the other mechanism projecting toward the other side of the machine, and an upright channel wall along each side of and away from the body of the machine, toward which channel walls the picking fingers extend angularly to the vertical and to the line of travel of the machine to pick cotton from the plants entering between said walls and the body of the machine.

56. A cotton picking machine including picking fingers which are axially rotated and are inserted within and withdrawn from the cotton plants, picking finger operating apparatus actuated by the machine in traveling, said picking fingers and apparatus being adapted for passage between adjacent rows of cotton plants, the picking finger operating apparatus being adapted to project picking fingers toward both sides of the machine into the plants between which said apparatus is passing, and an upright channel wall along each side of and away from the body of the machine, toward which channel walls the picking fingers extend angularly to the vertical and to the line of travel of the machine to pick cotton from the plants entering between said walls and the body of the machine, whereby cotton may be picked from the adjacent rows of cotton plants at the same time.

57. A cotton picking machine having a channel within which cotton plant portions may be received, and cotton picking mechanism operated by the machine in traveling and including picking fingers moving in substantially horizontal planes and adapted to extend substantially across said channel to pick cotton from the plant portions interposed between the walls of said channel, the wall of the channel opposite the bases of the fingers being cut away to receive the free ends of the fingers.

58. A cotton picking machine having a channel within which cotton plant portions may be received, and cotton picking mechanism operated by the machine in traveling and including picking fingers moving in substantially horizontal planes and adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers.

59. A cotton picking machine having a channel within which cotton plant portions may be received, and cotton picking mechanism including picking fingers moving in substantially horizontal planes and adapted to extend entirely across said channel to pick cotton from the plant portions interposed between the walls of said channel.

60. A cotton picking machine having a channel within which cotton plant portions may be received, and cotton picking mechanism including picking fingers moving in substantially horizontal planes and adapted to extend entirely across said channel to pick cotton from the plant portions interposed between the walls of said channel, the wall of the channel adjacent to the bases of the fingers being slotted to permit the fingers to pass therethrough.

61. A cotton picking machine having a channel within which cotton plant portions may be received, and cotton picking mechanism operated by the machine in traveling and including picking fingers moving in substantially horizontal planes and adapted to extend entirely across said channel to pick cotton from the plant portions interposed between the walls of said channel.

62. A cotton picking machine having a channel within which cotton plant portions may be received, and cotton picking mechanism operated by the machine in traveling and including picking fingers moving in substantially horizontal planes and adapted to extend entirely across said channel to pick cotton from the plant portions interposed between the walls of said channel, the wall of the channel adjacent to the bases of the fingers being slotted to permit the fingers to pass therethrough.

63. A cotton picking machine having a cotton plant receiving channel whose walls flank a row of cotton plant portions that the channel is adapted to receive, cotton picking mechanism operated by the machine in traveling, and means whereby the channel wall farthest from the picking mechanism may be moved toward and from the other channel wall during the operation of the machine to press the cotton plant portions between the channel walls.

64. A cotton picking machine having a cotton plant receiving channel whose walls flank a row of cotton plant portions that the channel is adapted to receive, cotton picking mechanism operated by the machine in traveling, and means whereby the space intervening between the channel walls may be adjusted.

65. A cotton picking machine having a cotton plant receiving channel whose walls flank a row of cotton plant portions that the channel is adapted to receive, cotton picking mechanism operated by the machine in traveling, and means whereby one of the channel walls may be moved toward and from the other channel wall during the operation of the machine to press the cotton plant portions between the channel walls.

66. A cotton picking machine having a cotton plant receiving channel whose walls flank a row of cotton plant portions that the channel is adapted to receive, cotton picking mechanism operated by the machine in traveling, including cotton picking fingers that are projected substantially across the channel, and means whereby the channel wall opposite the picking mechanism is movable toward the picking mechanism.

In witness whereof, I hereunto subscribe my name this 29th day of July A. D., 1908.

JOHN F. APPLEBY.

Witnesses:
L. G. STROH,
G. L. CRAGG.

---

Copies of this patent may be obtained for five cents each, by addressing the "Commissioner of Patents, Washington, D. C."